United States Patent Office 3,378,285
Patented Apr. 16, 1968

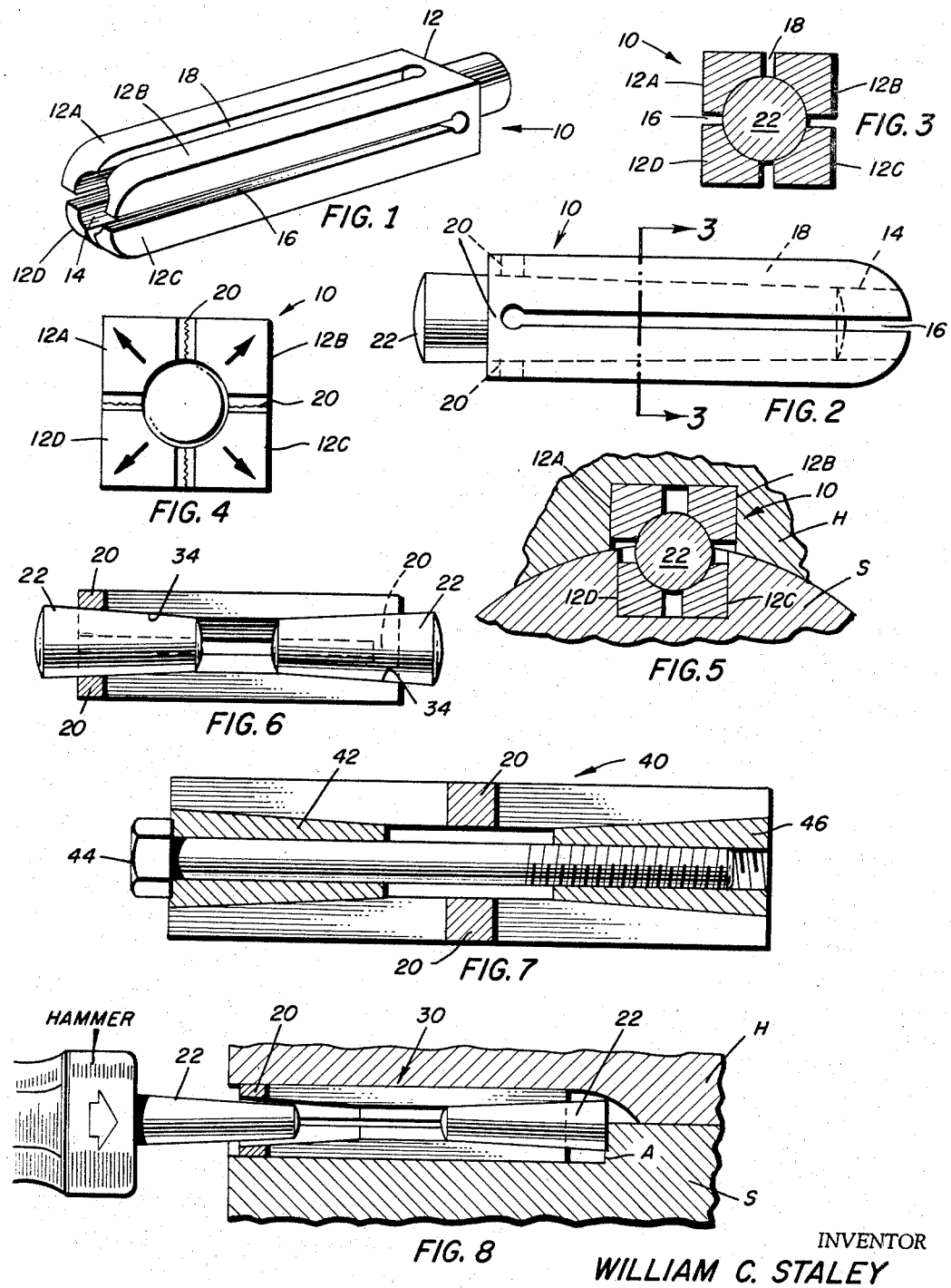

3,378,285
KEYING DEVICE
William C. Staley, 8236 Burnley Road,
Baltimore, Md. 21204
Filed Mar. 14, 1966, Ser. No. 534,230
2 Claims. (Cl. 287—52.05)

ABSTRACT OF THE DISCLOSURE

A spline of hardened, brittle material and square cross-section is divided into quarters by longitudinally intersecting slots, joined together by frangible bridges, and has a longitudinal tapered bore at least at one end thereof for receiving a tapered pin which drives the quarters outwardly filling the spline grooves in the hub and shaft being joined.

---

This invention relates generally to keying devices, and more particularly to improved expansion keys for holding keyed parts of wheels, cranks, shafts and other machinery in operative position.

A basic problem with keys has always been the tendency to looseness. A tight, perfectly fitted key is practically a hand fitting job and almost impossible to attain. When keyed parts are assembled with some looseness, however slight, the looseness will continue to increase as the machine runs. This is caused by the impact forces between the key and its groove.

Tapered keys have been used for many years in an attempt to provide a tight connection through wedging action. While this is somewhat effective, it still is usually impossible to get a perfect fit and besides the force to be resisted is typically many times greater than the resisting friction of the wedge.

Keyways in the mating parts are not exactly the same width due to machining tolerances. Attempts made to have these widths even close to exactly the same involves expensive machining and the discard of keyway cutters after they have worn only slightly.

Another problem with keyways is lack of perpendicular match caused by one half keyway tilted with respect to the other half.

It is the object of the present invention, therefore, to provide a radially expansive key for more accurately splining the hub of a pulley or like wheel on a shaft and which will not require exactly the same width in the mating keyways.

Yet another object of this invention is to provide a key which will fit old worn keyways more securely.

To provide an expansion key which will axially retain parts tightly on a shaft without the use of collars, is yet another object of this invention.

Also, to provide an expansion key for securing a wheel hub on a shaft which will take up looseness on both sides of a wheel hub and prevent wheel wobble, is still a further object of this invention.

Yet another object of this invention is to provide a retaining key for shaft mounted parts which can be used in plurality in the same hub with full assurance that each key will be completely seated in perfect fit for added strength.

Still yet another object of this invention is to provide a multiple piece expansion key in which the parts are initially joined together by frangible bridges which fracture or stretch on installation.

Other objects and attendant advantages of the invention will become more readily apparent and understood from the following detailed specification and single sheet of accompanying drawings in which:

FIG. 1 is a perspective view of an expansion key embodying features of this invention;

FIG. 2 is a plan view thereof;

FIG. 3 is a cross section taken on line 3—3 and viewed in the direction of the arrows of FIG. 2;

FIG. 4 is a view similar to FIG. 3 but viewed in the opposite direction showing the fracturing of the frangible bridges and depicting radiating force vectors resolving from installation of the key;

FIG. 5 is a cross section showing the novel key installed in a pair of non-matching keyway halves;

FIG. 6 is a longitudinal section of a double ended expandable key;

FIG. 7 depicts a double ended expandable key adapted for wrench expansion; and

FIG. 8 illustrates a hammer method for installing the improved key.

Referring now to the details of the invention as shown in FIGS. 1, 2 and 3, reference numeral 10 designates generally one embodiment of the expandable key of this invention. This key 10 consists of a rectangular spline 12 of ordinary, brittle or hard material such as plastic or metal which is provided with a tapered longitudinal bore 14 from end to end. Longitudinally median saw cuts 16, 18, are made from one end nearly to the other leaving the resulting quarters 12A, 12B, 12C, 12D joined by short frangible bridges 20 at the ends of the cuts. An oversize taper pin 22 matching the taper of the bore 14 is provided with each key 10.

As best shown in FIG. 4, when the pin 22, on installation of the key 10, is driven home in the bore 14, expansive force fractures one or more of the frangible bridges 20 and moves the resulting quarter or quarters of the spline outwardly in the directions of the arrows. Thus, as shown in FIG. 5, these resulting quarters 12A, 12B, 12C, 12D adapt themselves to tight conforming fit in the keyways of a hub H and the shaft S which are to be secured together.

It will be noted this obtains even if one half keyway is of different width from the other as illustrated or if an old worn keyway is being used or other inaccuracies such as tilting exist. In some cases bridges 20 may only stretch.

FIG. 6 illustrates a second embodiment of an expandable key 30. In this double-ended version, a tapered apertured 34 is provided from each end of the rectangular spline 32 and two taper pins 22 are employed, one in each aperture. Saw cuts 36, 38 may in this case be made oppositely, one from one end, and the other from the other end, leaving bridges 20 at both ends of the spline.

In FIG. 7 the spline is sawed from both ends in the same plane leaving the bridges 20 near the center to provide a third embodiment 40 of the invention. Also shown in FIG. 7, is a wrench-tightened expanding arrangement consisting of one taper pin 42 which is apertured for a machine bolt 44 and the opposing taper pin 46 which is drilled and tapped to fit the bolt.

In most cases, a ramp or abutment A exists from milling or broaching the keyway in either the hub H or the shaft S and this is conveniently used as a back-up against which the driving force of a hammer is expended as shown in FIG. 8. Thus short keys 30 (or 10) may be used where an approach from one end of an assembly only is possible.

If two ordinary keys are used around a shaft they influence one another causing one or the other to improperly fit its keyway. This is not the case with the present invention since each key expands where needed to result in both fitting perfectly.

The provision of the frangible bridges permits the ready handling of the improved key before and during installation without annoying loose parts.

Obviously many modifications and variations of the present invention are possible in light of the above teachings. It is, therefore, to be understood that within the scope of the appended claims the invention may be practiced otherwise than as specifically described.

What is claimed is:

1. An expandable key securing a hub member to a shaft member wherein opposed spline grooves are provided in said members and are subject to mis-registering, comprising a rectangular spline formed of hardened, brittle material and having a square cross-section and a bore extending therethrough, said spline received in said opposed grooves and having longitudinally intersecting slots dividing said spline into quarters, said bore being formed with converging tapered portions at opposite ends thereof and said longitudinally intersecting slots being formed oppositely, one from one end and the other from the other end leaving frangible bridges at both ends of said spline joining said quarters, and a tapered pin for each tapered portion of the bore, whereby on driving said tapered pins forcibly in said converging tapered portions, said quarters move radially independently of each other to fill said spline grooves in said members.

2. An expandable key securing a hub member to a shaft member wherein opposed spline grooves are provided in said members and are subject to mis-registering, comprising a rectangular spline formed of hardened, brittle material and having a square cross-section and a bore extending therethrough, said spline received in said opposed grooves and having longitudinally intersecting slots dividing said spline into quarters, said bore being formed with converging tapered portions at opposite ends thereof and said longitudinally intersecting slots extending from both ends in the same plane leaving frangible bridges near the center of said spline joining said quarters, and a tapered pin for each tapered portion of the bore whereby on driving said tapered pins forcibly in said converging tapered portions said quarters move radially independently of each other to fill said spline grooves in said members.

References Cited

UNITED STATES PATENTS

| | | | |
|---|---|---|---|
| 1,264,230 | 4/1918 | Vierus | 287—52.05 X |
| 1,435,811 | 11/1922 | Cuntala | 287—52.05 |
| 1,769,667 | 10/1923 | Pleister | 85—72 |
| 2,332,408 | 10/1943 | Stenger | 85—67 X |
| 2,960,342 | 11/1960 | Raper | 287—123 X |
| 3,054,320 | 9/1962 | Dickow | 85—67 |

FOREIGN PATENTS

| | | |
|---|---|---|
| 1,328,744 | 4/1963 | France. |
| 474,657 | 9/1952 | Italy. |
| 168,967 | 10/1959 | Sweden. |

EDWARD C. ALLEN, *Primary Examiner.*

ANDREW V. KUNDRAT, *Assistant Examiner.*